United States Patent [19]
Kausch

[11] Patent Number: 4,802,548
[45] Date of Patent: Feb. 7, 1989

[54] AUTOMATIC GUIDED VEHICLE SAFETY SYSTEM

[75] Inventor: James R. Kausch, Newport News, Va.

[73] Assignee: Munck Automation Technology, Inc., Newport News, Va.

[21] Appl. No.: 135,984

[22] Filed: Dec. 21, 1987

[51] Int. Cl.⁴ .......... B60K 28/10
[52] U.S. Cl. .......... 180/274; 250/206; 293/4
[58] Field of Search .......... 180/274, 275, 277; 293/4; 340/61; 250/206, 211 R

[56] References Cited

U.S. PATENT DOCUMENTS

| | | | |
|---|---|---|---|
| 2,920,713 | 1/1960 | Paradise | 180/277 |
| 3,496,317 | 2/1970 | Reed | 200/52 |
| 3,664,701 | 5/1972 | Kondur | 180/275 |
| 3,901,346 | 8/1975 | Kohls et al. | 180/277 |
| 4,137,984 | 2/1979 | Jennings et al. | 180/98 |
| 4,299,496 | 11/1981 | Lord | 356/446 |
| 4,363,376 | 12/1982 | Sjoberg et al. | 180/275 |
| 4,397,372 | 8/1983 | De Kraker | 180/277 |
| 4,730,690 | 3/1988 | McNutt et al. | 180/274 |

*Primary Examiner*—David M. Mitchell
*Assistant Examiner*—Ross Weaver
*Attorney, Agent, or Firm*—Wallace J. Nelson

[57] ABSTRACT

A flexible bumper 11, 14 is provided on an automatic guided vehicle 10 carrying an emitter/receiver photocell 21 thereon in electrical connection with motor circuit 28 and brake circuit 29. When photocell 21 is actuated by a suitable relay, the photocell beam signal 27 (FIG. 1) is transmitted through fiber optic cables 22, 23, emitter 25 and receiver 26 to permit propulsion motor operation through motor circuit 28 and vehicle brake release through brake circuit 29. If vehicle 10 strikes an obstruction safety bumper 11 is deflected, causing the aligned emitter-receiver beam 27 to be interrupted. This interruption of the beam signal to photocell 21 triggers motor circuit 28 to stop the motor and causes brake circuit 29 to set the vehicle brakes. When the obstruction is removed, the bumper deflects back to its normal position and light beam 27 is again transmitted to photocell 21 to permit brake release and motor operation to resume.

Various emitter-receiver locations for both unidirectional and bi-directional vehicles as illustrated in the several drawing figures are disclosed. In all embodiments of the invention, at least one of the emitter and receiver is carried by the flexible safety bumper.

8 Claims, 3 Drawing Sheets

AUTOMATIC GUIDED VEHICLE SAFETY SYSTEM

FIELD OF THE INVENTION

This invention relates to safety bumper systems for automatic guided vehicles and relates in particularly to a safety system for inactivating the electrical driving motor of the vehicle and applying the vehicle brakes when a deflectable bumper attached to the vehicle comes in contact with an obstruction.

BACKGROUND OF THE INVENTION

Safety bumpers for automatic guided vehicles that employ electric switching apparatus operable to stop the vehicle when the bumper is deflected are well known and are disclosed, for example, in U.S. Pat. Nos. 2,920,713, 3,496,317 and 3,1901,346. Also, in U.S. Pat. No. 3,664,701, a deflectable bumper for an automatic guided vehicle is employed wherein a reflective element on the vehicle bumper is adapted to reflect a light from a photocell to complete an electric circuit that permits the vehicle motor to operate and the vehicle brakes to be held in release position. When the bumper of this patented device strikes an obstruction, the bumper deflects causing the reflective element thereon to move out of alignment with the photocell carried by the vehicle to thereby interrupt the electric circuit, stopping the vehicle motor and applying the brakes. While this patented device operates adequately under most conditions, it occasionally presents problems since there are certain points on the bumper that do not activate the vehicle brakes when an obstruction is contacted because the bumper deflection is not adequate to move the reflector out of the beam of the photocell. Also, at times, up and down bumper movement, or wobble, when the vehicle is traversing uneven surfaces causes the reflector to move out of alignment with the photocell beam and results in false vehicle stops.

It is an object of the present invention to provide a reliable safety bumper for automatic guided vehicles that utilizes the advantageous features of the prior art devices while minimizing the disadvantages thereof.

It is a further object of the present invention to provide a reliable safety bumper for an automatic guided vehicle that deflects upon contact with an obstruction and causes interruption of an aligned light beam signal to a photocell to inactivate the vehicle motor and apply the vehicle brakes.

It is another object of the present invention to provide a reliable safety bumper for an automatic guided vehicle that minimizes false vehicle stops.

SUMMARY OF THE INVENTION

According to the present invention the foregoing and additional objects are attained by providing a flexible safety bumper on an automatic guided vehicle with an emitter/receiver photocell carried by the vehicle being in electrical connection with both a motor circuit and a brake circuit for the vehicle. A first fiber optic cable leads from the photocell and is an emitter at the other end thereof. A second fiber optic cable also leads from the photocell and is a receiver at its other end. The fiber optic emitter and the fiber optic receiver are normally disposed in optical alignment whereby a photocell beam signal emitted by the emitter will be received by the receiver and transmitted back to the photocell to complete the circuit. At least one of the emitter and receiver is carried by the flexible safety bumper. When the photocell is actuated by a suitable switch, the photocell beam signal is transmitted through the fiber optic cable emitter-receiver to permit propulsion motor operation through the motor circuit and vehicle brake release through the brake circuit. If the vehicle strikes an obstruction the safety bumper is deflected causing the aligned emitter-receiver beam to be interrupted. Some of the embodiments of the present invention also provide the added feature of stopping the vehicle if it is struck from the side.

This interruption of the beam signal to the photocell triggers the motor circuit to stop the motor and the brake circuit to set the vehicle brakes. When the obstruction is removed, the bumper deflects back to its normal position and the light beam is again received by the receiver and transmitted to the photocell to permit brake release and motor operation to resume.

BRIEF DESCRIPTION OF THE DRAWINGS

A more complete appreciation of the invention and many of the attendant advantages thereof will be more readily apparent as the same becomes better understood in reference to the following detailed description when considered in reference to the accompanying drawings wherein.

DETAILED DESCRIPTION OF THE INVENTION

Figure 1:
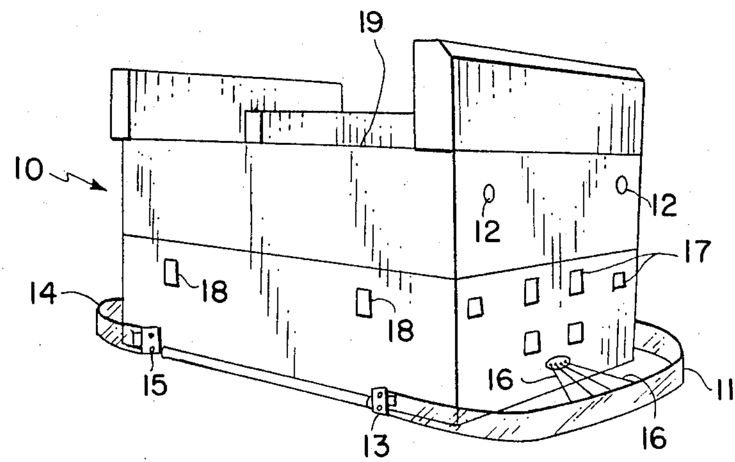
FIG. 1 is a view of an exemplary automatic guided vehicle employing the safety features of the present invention.

Referring now to the drawings and more particularly to FIG. 1, there is shown an automatic guided vehicle (AGV) generally designated by reference numeral 10, employing a safety flexible bumper system according to the present invention. AGV 10 is a bi-directional vehicle and is provided with a flexible safety bumper at each end thereof, as designated by reference numerals 11, 14.

Safety bumpers 11, 14 in the preferred embodiments of the present invention are formed of a clear flexible plastic material, e.g., polyvinyl chloride and are attached at the ends thereof by hinges 13, 15 at the front and rear, respectively, of AGV 10. Identical brackets are disposed on the side of vehicle 10 not shown in FIG. 1 for securing the other ends of bumpers 11, 14 to vehicle 10. In the illustrated preferred embodiments, safety bumpers 11, 14 are approximately ninety inches long, approximately four inches wide and have a thickness of approximately one-eighth inch. These dimensions are not critical and may vary on various vehicles. Bumpers 11, 14 are designed to bend or flex when vehicle 10 strikes an obstruction and to spring back into the original configuration when the obstruction is removed.

A plurality of wire or cable supports 16 are connected to spaced points along each bumper 11, 14 and to vehicle 10 to assist in maintaining bumper 10 in position. Manually operated emergency stop buttons 12 are provided on the ends of vehicle 10, as illustrated. A plurality of lights, some of which are designated by reference numerals 17, 18 are strategically placed about vehicle 10 and serve to give visual indication to workers in the vicinity that vehicle 10 is or is not in operation. The top surface of vehicle 10 serves as a load carrying deck 19 and is adaptable for multiple load handling capability. Deck 19 may include powered rollers, lifting/loading devices or shuttle-type extractors. AGV 10 is designed for bi-directional travel with capability for tight turning and pivoting and is adapted to carry loads up to 4000 pounds at speeds up to 240 feet per minute.

Figure 2:
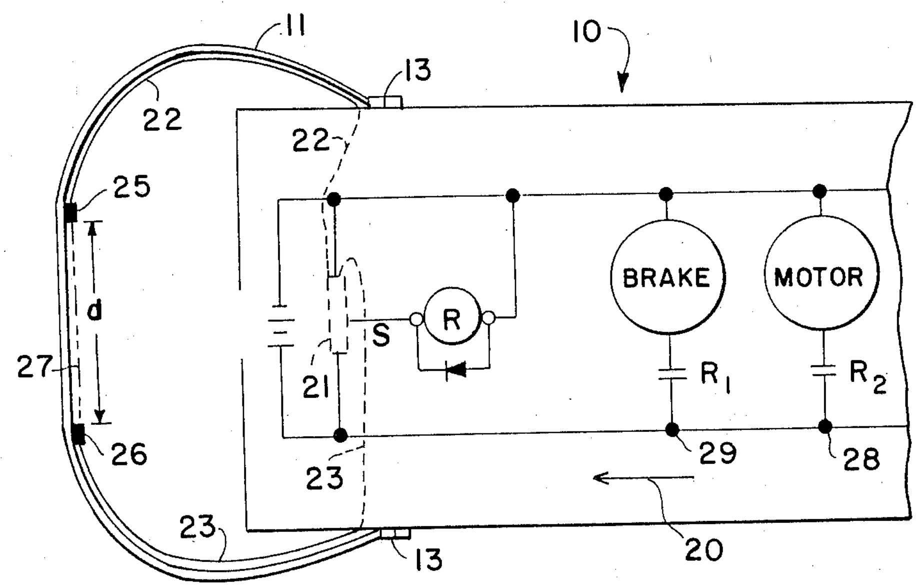
FIG. 2 is a part schematic view of the automatic guided vehicle shown in FIG. 1 and illustrating one embodiment for the safety bumper system of the present invention.

Referring now more particularly to FIG. 2, a top, part schematic, view of AGV 10 is illustrated with arrow 20 designating the forward direction of vehicle travel. A photocell 21 is carried by AGV 10 and is provided with a pair of fiber optic cables 22, 23 extending therefrom. Fiber optic cables 22, 23 are attached to bumper 11 beginning at the opposite attached ends thereof and terminate in aligned relationship along the front interior bumper surface. The ends of cables 22, 23 are spaced a distance d apart. Conventional clamps and suitable rubber or plastic electrical tape are used to secure the fiber optic cables 22, 23 to the top inside surface of bumper 11. An emitter element 25 is secured to the end of fiber optic cable 22 and a receiver element 26 is secured to the terminal end of fiber optic cable 23. A motor circuit 28 and a brake circuit 29 are also carried by vehicle 10 and are in operative electric contact with photocell 21.

When photocell 21 is actuated by a suitable relay, a light beam 27 therefrom will be transmitted through fiber optic cable 22, emitted through emitter 25, received by aligned receiver 26 and transmitted back to photocell 21 via cable 23. As long as the light beam signal 27 is being transmitted back to photocell 21, vehicle 10 may progress in the forward direction as indicated by arrow 20 with motor circuit 28 and brake circuit 29 operating in response to signals received from photocell 21 in a conventional manner. More specifically, the output from photocell 21 energizes motor circuit 28 causing forward vehicle motion, while simultaneously releasing the vehicle brakes by energizing brake circuit 29. Thus, when bumper 11 is undisturbed, signal wire S has voltage and holds relay R energized. This, in turn, holds contacts R1 and R2 closed, permitting vehicle operation. When brake circuit 29 is energized, the vehicle brakes are not engaged. When photocell beam 27 is interrupted, signal S is lost, relay R is de-energized and contacts R1 and R2 revert to open position thereby stopping the vehicle motor and setting the brakes.

For reverse vehicle movement of bi-directional vehicle 10, a different relay or switch is actuated which causes photocell 21 to energize a reverse control relay instead of the forward control relay in motor circuit 28. In either direction, automatic guided vehicle 10 moves as programmed until it encounters an obstruction. When an obstruction is encountered, bumper 11 bends or deflects causing emitter 25 and receiver 26 to be moved out of alignment such that light beam signal 27 is no longer transmitted back to photocell sensor 21. This interruption of the light signal de-energizes the relays in motor circuit 28 and brake circuit 29 thereby stopping the motor and setting the brakes to stop vehicle 10. Upon removal of the obstruction, safety bumper 11 springs or deflects back to its original position to again optically align emitter 25 and receiver 26 and permit the light beam signal 27 to again be transmitted to photocell sensor 21 and vehicle 10, after a timed delay, resumes its course.

"MQ-F Optical Fiber Photoelectric Switches", available from AROMAT, 250 Sheffield Street, Mountainside, NJ 07092, are suitable for use in the practice of the present invention.

The photocell sensor, motor and brake circuits are not shown in the remaining embodiments to be described, in the interest of brevity, it being understood that they function in the same manner as described hereinbefore in reference to FIG. 2.

Figure 3:
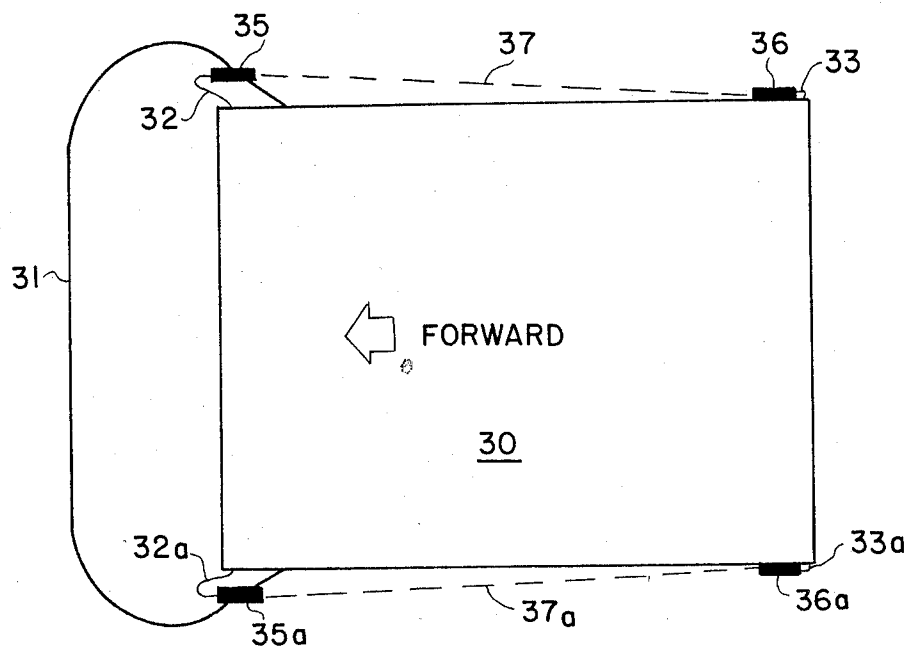
FIG. 3 is a schematic view similar to FIG. 2 showing another embodiment of the photocell emitter-receiver location relative to the safety bumper.

Referring now to FIG. 3, another embodiment of the present invention is shown as utilized on a unidirectional vehicle 30. In this embodiment a pair of emitters 35, 35a are connected, respectively, to the terminal ends of fiber optical cables 32, 32a and securely attached to bumper 31 adjacent to the ends of bumper 31 where it attaches to vehicle 30. The receiver units 36, 36a are secured to opposite sides of the aft frame of vehicle 30 and connected, respectively, to the terminal ends of fiber optical cables 33, 33a.

When vehicle 30 encounters an obstruction during forward movement, bumper 31 is deflected, causing movement of one or both of emitter units 35, 35a to thereby interrupt the light beam signal 27, 27a and stop vehicle 30, as described hereinbefore in reference to FIG. 2. In this embodiment, the photocell sensor is designed so that a signal must be received from both receiver units 33, 33a for vehicle 30 to operate. Thus, interruption of either light beam signal 37, 37a will stop the motor and set the brakes on vehicle 30.

Figure 4:
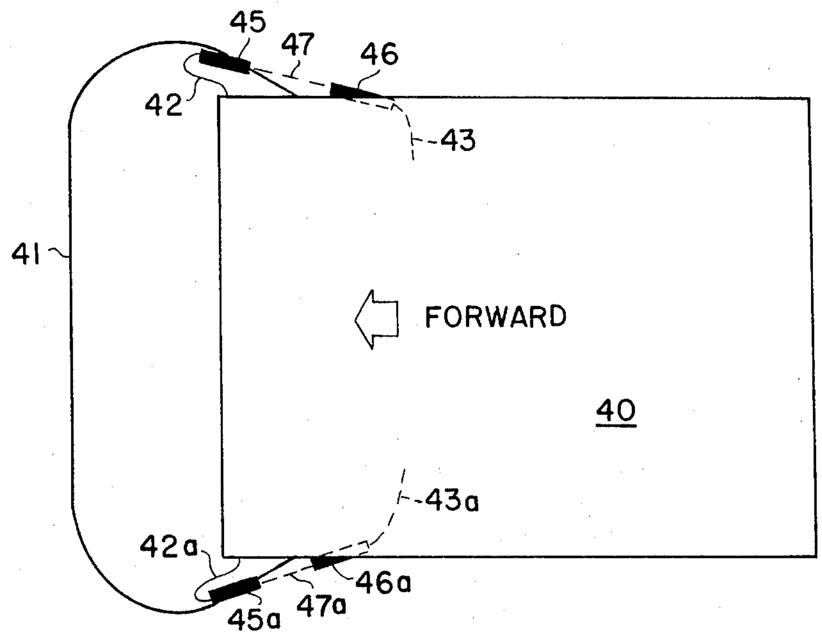
FIG. 4 is a schematic view similar to FIG. 2 illustrating another embodiment of the photocell emitter-receiver location.

Referring now to FIG. 4 unidirectional automatic controlled vehicle 40 is provided with a pair of emitter units 45, 45a connected, respectively, to the terminal ends of fiber optic cables 42, 42a. Emitter units 45, 45a are securely attached to bumper 41 adjacent the ends thereof that are secured to vehicle 40. A pair of receiver units 46, 46a connected, respectively, to the terminal ends of fiber optical cables 43, 43a are secured to opposite sides of the chassis of vehicle 40. Receiver units 46, 46a are disposed adjacent the bumper ends attached to vehicle 40 and in spaced optical alignment with respective emitter units 45, 45a. As in the embodiment of FIG. 3, when vehicle 40 encounters an obstruction during forward movement, bumper 41 will deflect causing one or both of emitter units 45, 45a to move out of optical alignment with the respective receiver units 46, 46a. This interrupts the light beam signal 47, 47a and stops vehicle 40. The system is designed such that the interruption of either light beam signal 47, 47a will stop the motor and apply brakes to vehicle 40.

Figure 5:
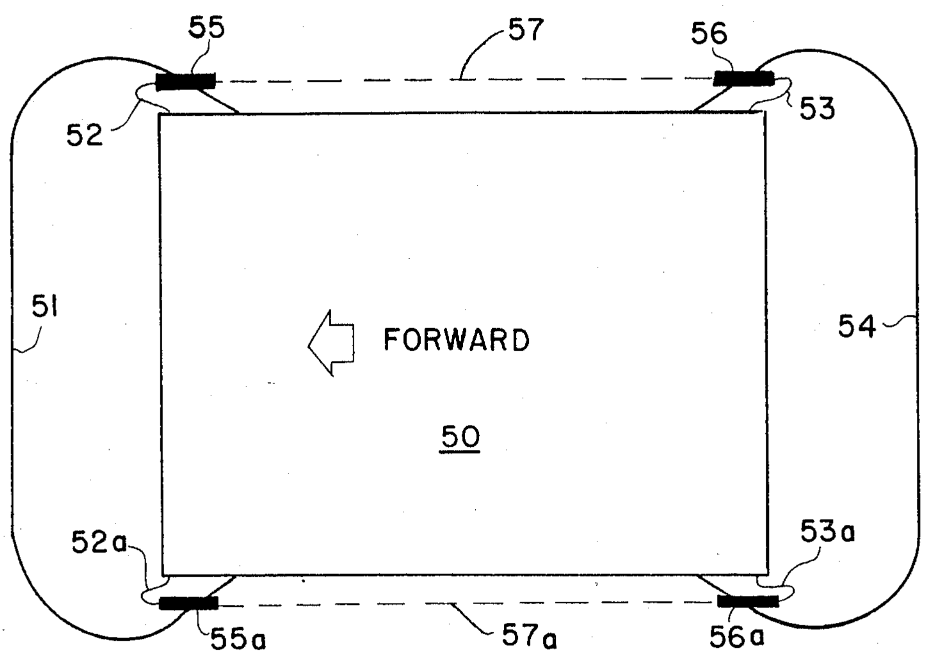
FIG. 5 is a schematic view illustrating another embodiment location for the emitter-receiver on a bi-directional automatic guided vehicle; and, FIG. 6 is a schematic view illustrating another embodiment of a bi-directional vehicle employing four emitter-receiver units.

Referring now to FIG. 5, an embodiment of the present invention is shown as applied to another bi-directional automatic control vehicle 50. In this embodiment a pair of emitters 55, 55a are connected, respectively, to the terminal ends of fiber optic cables 52, 52a and securely attached to front bumper 51 in spaced adjacency to the ends thereof that are secured to vehicle 50. A pair of receiver units 56, 56a connected respectively, to the terminal ends of fiber optical cables 53, 53a, are secured to opposite sides of rear bumper 54 of vehicle 50. Thus, when vehicle 50 encounters an obstruction while traveling in either direction, the encounter bumper 51 or 54 will deflect causing interruption of one or both of light beam signals 57, 57*a* and effect stoppage of the vehicle motor and application of the vehicle brakes.

Figure 6:
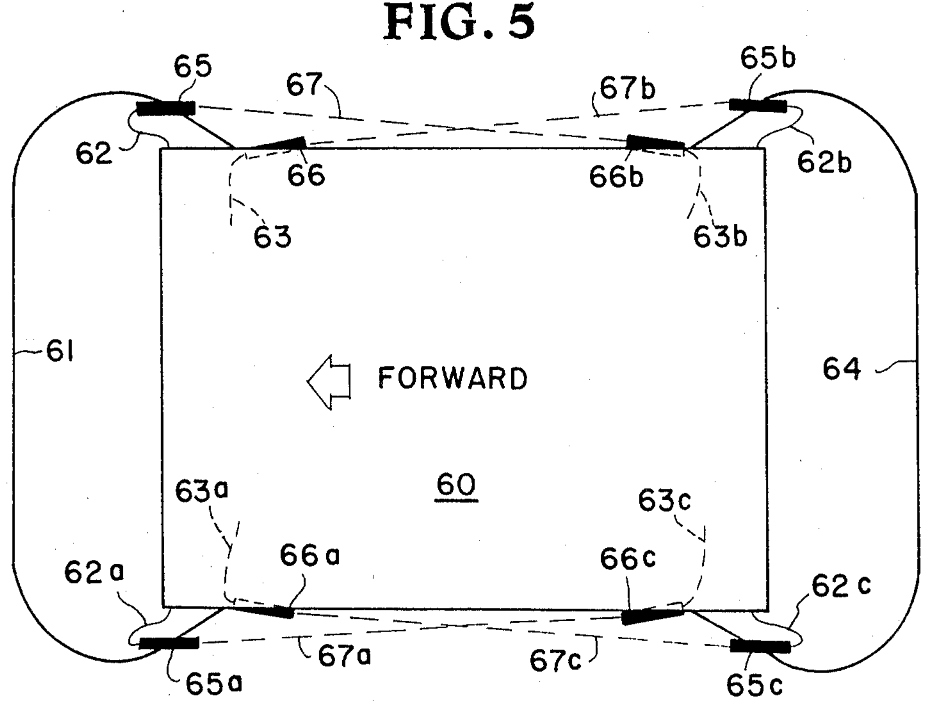

Referring now to FIG. 6, another embodiment of the present invention is shown on bi-directional automatic guided vehicle 60. In this embodiment four emitter units are employed as designated by reference numerals 65, 65*a*, 65*b*, and 65*c* and connected respectively, to fiber optic cables 62, 62*a*, 62*b*, and 62*c*. Emitter units 65, 65*a* are securely attached to front bumper 61 in spaced adjacency to the bumper ends secured to vehicle 60. Emitter units 65*b* and 65*c* are secured to the back bumper 64 of vehicle 60 in spaced adjacency to the bumper 64 ends secured to vehicle 60. Four receiver units 66, 66*a*, 66*b* and 66*c* connected respectively, to the terminal ends of fiber optical cables 63, 63*a*, 63*b* and 63*c* are secured two to each side of the chassis of vehicle 60, as shown in FIG. 6. Receiver units 66 and 66*a* are secured to opposite sides of vehicle 60 in spaced adjacency to the connections of bumper 61 to the chassis of vehicle 60. Receiver units 66 and 66*a* are disposed in optical alignment with respective emitter units 65*b* and 65*c* to receive respective light beam signals 67*b* and 67*c* therefrom.

Receiver units 66*b* and 66*c* are secured to opposite sides of vehicle 60 in spaced adjacency to the connection of rear bumper 64 to the chassis of vehicle 60. Receiver units 66*b* and 66*c* are disposed in optical alignment with respective emitter units 65 and 65*a* to receive respective light beam signals 67, 67*a* therefrom. Thus, when vehicle 60 encounters an obstruction while traveling in either direction, the encountered bumper 61 or 64 will deflect causing interruption of one or more of light beam signals 67, 67*a*, 67*a* and 67*c* and thereby effect stoppage of the motor and application of the brakes on vehicle 60.

In each of the described embodiments employing multiple light beam signals, it is preferred that the photocell sensor be designed to stop the vehicle upon interruption of any one of the signals. However, if less sensitive action is desired, the photocell sensor circuit may be designed to require interruption of all signals received thereby before inactivation of the motor circuit and application of the brakes.

In the embodiment of the present invention shown in FIG. 2, for example, variation or changing of the distance d that emitter unit 25 is placed from receiver unit 26 varies or changes the sensitivity of the photocell sensor operation. Thus, when distance d is shortened, the system is less sensitive to minor vehicle obstruction than when this distance is lengthened. Similarly, it would be expected that the embodiment illustrated in FIG. 3 would be more sensitive to minor bumper encounters than the embodiment shown in FIG. 4. Also, multiple emitter-receiver unit combinations are designed to be more sensitive to minor bumper encounters than the single emitter-receiver system shown in FIG. 2. There is also a sensitivity adjustment (not shown) provided on the photocell unit.

Although the invention has been described relative to specific embodiments thereof, it is not intended to be so limited. There are numerous modifications and variations of the present invention that will be readily apparent to those skilled in the art in the light of the above teachings. It is therefore to be understood that within the scope of the appended claims the invention may be practiced other than as specifically described.

What is claimed as new and desired to be secured by Letters Patent of the United States is:

1. In combination with an automatic guided vehicle, deflectable bumper means mounted on the vehicle and adapted to signal contact with an obstruction;

a light source mounted on the vehicle and forming part of an electric circuit;

fiber optic emitter means in operative connection with said light source for transmitting a light signal therefrom;

fiber optic receiver means in spaced optical alignment with said emitter means for receiving a light signal optic emitter means and said both said fiber optic emitter means and said fiber optic receiver means being secured to said deflectable bumper means and moveable therewith;

said fiber optic emitter means and said fiber optic receiver means when in optical alignment serving to complete an electric circuit that permits said automatic guided vehicle to operate; and, whereby when said deflectable bumper means contacts an obstruction said bumper will deflect and move said at least one of said fiber optic emitter means and said fiber optic receiver means out of optical alignment to thereby open the electric circuit and cause said automatic guided vehicle to stop.

2. The combination of claim 1 wherein said automatic guided vehicle is a bi-directional vehicle and said deflectable bumper means includes a front deflectable bumper and a rear deflectable bumper secured to opposite ends of said automatic guided vehicle;

said fiber optic emitter means comprises a pair of emitter units mounted, one each, adjacent an end of said front deflectable bumper;

said fiber optic receiver means includes a pair of receiver units mounted, one each, adjacent an end of said rear deflectable bumper; and, each of said receiver units being in optical alignment with one of said emitter units.

3. In combination with an automatic guided vehicle having an electrical propulsion motor and electrically controlled brakes, the improvement therewith comprising:

a photoelectric cell carried by said vehicle, a first fiber optic cable connected at one end to and extending from said photoelectric cell, a light signal emitter secured to the other end of said first fiber optic cable and adapted to emit a light beam signal from said photoelectric cell, a second fiber optic cable connected at one end to and extending from said photoelectric cell;

a light beam receiver connected to the other end of said second fiber optic cable and adapted to receive the photo light beam emitted by said emitter when said emitter and said receiver are in optical alignment, a deflectable bumper mounted on said automatic guided vehicle, said emitter and said receiver being disposed in spaced relationship and at least one of the said emitter and said receiver being mounted on said deflectable bumper so as to be in optical alignment with the other of said emitter and said receiver, said photoelectric cell being in electrical circuity with the electrical propulsion motor and electrically controlled brakes whereby when said emitter and said receiver are in optical alignment the electric motor will operate and the vehicle brakes are in released position and when said deflectable bumper contacts an obstruction, said emitter and said receiver will be knocked out of alignment to thereby cause the vehicle brakes to be applied and the electric motor to be inactivated.

4. The combination of claim 3 wherein said automatic guided vehicle is a unidirectional vehicle and said light signal emitter comprises a pair of emitter units mounted, one each, adjacent an end of said deflectable bumper and said light beam receiver comprises a pair of receiver units mounted, one each, on opposite sides of said vehicle in spaced adjacency and, in optical alignment with one of said emitter units.

5. The combination of claim 3 wherein said automatic guided vehicle is a bi-directional vehicle having a front deflectable bumper and a rear deflectable bumper;

each said front and said rear deflectable bumper spanning an end of said vehicle and having ends thereof connected to the sides of said vehicle;

said light signal emitter comprising a pair of emitter units mounted on each of said front deflectable bumper and said rear deflectable bumper adjacent the ends thereof connected to said vehicle;

said light beam receiver including a pair of receiver units mounted, one each, on said vehicle in spaced adjacency to the ends of said front bumper and a pair of receiver units mounted, one each, on said vehicle in spaced adjacency to the ends of said rear bumper; and wherein said emitter units mounted on said front bumper are disposed in optical alignment with said receiver units mounted on said vehicle in spaced adjacency to the ends of said rear bumper and said emitter units mounted on said rear bumper are disposed in optical alignment with said receiver units mounted on the vehicle in spaced adjacency to the ends of said front bumper and wherein when said vehicle contacts an obstruction while moving in either direction the deflection of the encountered bumper will cause at least one of said emitter-receiver units to move out of optical alignment and effect vehicle brake application and motor stoppage.

6. The combination of claim 3 including said automatic guided vehicle being a bi-directional vehicle having a front and a rear end and provided with a deflectable bumper mounted on each of said front and said rear ends, and wherein said emitter is mounted on one of said bumpers and said receiver is mounted on the other of said bumpers and in optical alignment with said emitter.

7. The combination of claim 3 wherein said automatic guided vehicle is a unidirectional vehicle and including a pair of emitters mounted on said deflectable bumper and a pair of receivers mounted on the aft end of said vehicle chassis, each of said pair of receivers being in optical alignment with one of said pair of emitters.

8. In combination with an automatic guided vehicle having an electrical propulsion motor and electrically controlled brakes, the improvement therewith comprising:

a photoelectric cell carried by said vehicle, a first fiber optic cable connected at one end to and extending from said photoelectric cell, a light signal emitter secured to the other end of said first fiber optic cable and adapted to emit a light beam signal from said photoelectric cell, a second fiber optic cable connected at one end to and extending from said photoelectric cell;

a light beam receiver connected to the other end of said second fiber optic cable and adapted to receive the photo light beam emitted by said emitter when said emitter and said receiver are in optical alignment, a deflectable bumper mounted on said automatic guided vehicle, both said emitter and said receiver being mounted on said deflectable bumper and disposed in spaced optical alignment relationship thereon;

said photoelectric cell being in electrical circuity with the electrical propulsion motor and electrically controlled brakes whereby when said emitter and said receiver are in optical alignment the electric motor will operate and the vehicle brakes are in released position and when said deflectable bumper contacts an obstruction, said emitter and said receiver will be knocked out of alignment to thereby cause the vehicle brakes to be applied and the electric motor to be inactivated, and wherein the sensitivity of the electric motor and vehicle brake operation is adjustable by changing the spacing between said emitter and said receiver.

* * * * *